June 28, 1938. H. LOBBENBERG 2,122,323
DEVICE FOR FASTENING CORSETS
Filed Dec. 15, 1936
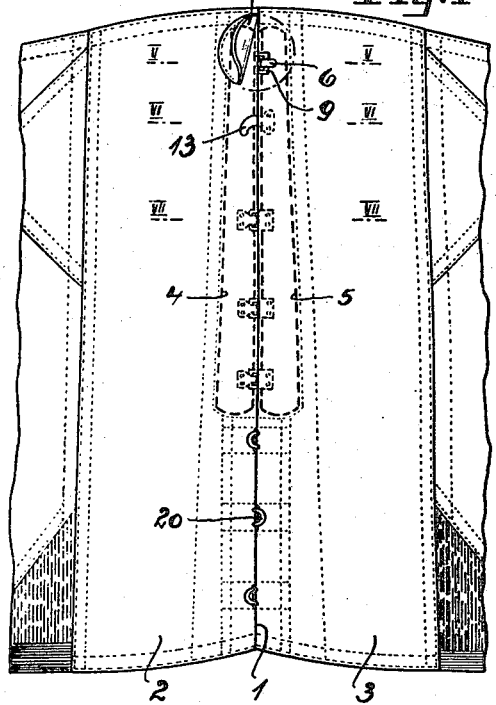
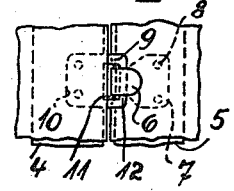
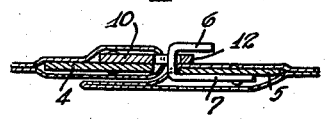
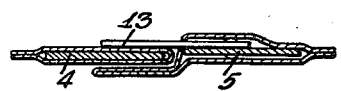
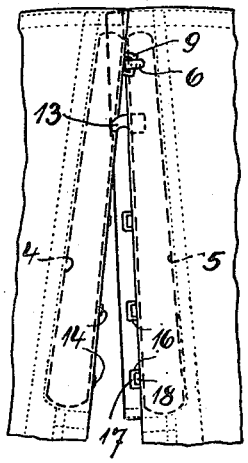
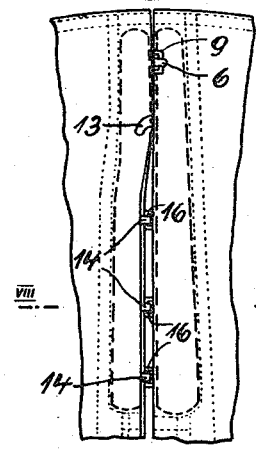
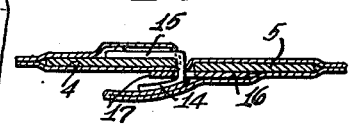
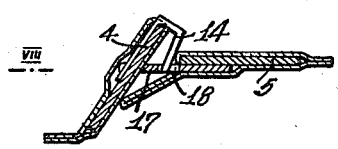

Patented June 28, 1938

2,122,323

UNITED STATES PATENT OFFICE 2,122,323

DEVICE FOR FASTENING CORSETS

Hans Lobbenberg, Cologne, Germany

Application December 15, 1936, Serial No. 115,995
In Germany March 16, 1936

2 Claims. (Cl. 2—38)

This invention relates to a corset fastening in which the connecting means between the two fastening strips sewn into the adjacent contacting fastening edges of the corset body consists of flat hooks which are bent over from their fastening point on one surface of this fastening strip through the fastening join over the opposite surface of the said fastening strip and cooperate with broad eyes which are fixed opposite each of these hooks on the other fastening strip either on the same or on the opposite flat side of the fastening strip. In the hitherto known corset fastenings of this type the fastening point of the flat hooks lies on the inside of the fastening strips so that the hooks themselves project to a comparatively large extent on the outside of the fastening join. In this way these hooks can damage the parts of the underclothes which are subjected to rubbing by the movements of the body.

The flat hook connection according to the invention is however constructed in such a way that the connecting point of the flat hooks lies with its fastening strip on the outside of the corset or of these fastening strips whilst the hooks are correspondingly bent back over the edge of the latter on its rear side and the corresponding broad eyes are likewise attached to the inside of the other fastening strip. In this way the outside of the corset is completely free of projecting fastening parts.

At the same time it is possible by means of this arrangement to keep the projections of the hook tongues on the inside of the corset body within small practically imperceptible limits and to keep the breadth of the slot of the broad eyes cooperating with the flat hooks so small that in the closed position the two contacting edges of the fastening strips covered with the corset material contact closely with each other so that a more or less wide fastening opening, which is unavoidable in the majority of corset fastenings, is avoided. A considerable advantage is produced by the close contact of the joining edges in that the undesired opening of the fastenings is avoided if with certain body movements there is a considerable reduction of circumferential tension on the connecting means of the corset body.

According to the invention the fastening is made secure against inadvertent unfastening through the fact that on introducing the ends of the hooks into the opening broad eyes the flat sides of the two fastening strips are placed together at an oblique angle from the outside and after engagement of the hooks they are guided into the flattened position opposite each other adjacent the body. In this way, contrary to the known connecting means provided with flat hooks or button connections, the breadth of the eye openings transversely to the fastening join can be kept so small that the fastening hooks when introduced into these openings are practically free from play.

In order to avoid difficulties in obtaining the correct position of introduction of the hooks on account of the small width of the opening of the broad hooks according to the invention, the device is preferably so arranged that, with the use of a blind clasp as a supporting means a separating hook fastening opened on the front and arranged above said clasp is provided whereby this arrangement can be easily operated and is constructed in such a way that through the cooperation with the blind clasp it secures in a positive movement the position of engagement of the inwardly bent fastening hooks of the fastening disposed below the said clasp.

Reference will now be made to the accompanying drawing which illustrates by way of example one form of construction of the invention and in which:—

Fig. 1 shows a part front elevation of a corset in closed state.

Fig. 2 shows in a similar view the edge parts of the corset fastening in question in the position in which they are found during the first stage of the formation of the fastening connection.

Fig. 3 shows the parts in a similar manner during the succeeding second closing stage.

Fig. 4 shows in detail the closure parts of the upper and supporting hook fastening in front elevation.

Fig. 5 is a central cross section through this supporting hook fastening.

Fig. 6 is a similar cross section on a larger scale on the line VI—VI of Fig. 1.

Fig. 7 is a similar view on the line VII—VII of Fig. 1, and

Fig. 8 is a similar cross section on the line VIII—VIII of Fig. 3.

The fastening strips 4 and 5 of the corset fastening consist as is usual of flat plates of resilient steel and are sewn into the material between the sections 2 and 3, on both sides of the corset adjacent the fastening join 1. Near the upper end of the fastening strip 5 lying on the left in the drawing there is provided a hook 6 preferably consisting of flat sheet material and disposed so that it is attached with its broad base part 7 on the back surface of the fastening strip of both sides by means of rivets 8 whilst its tongue-shaped end is bent around the fastening edge of this fastening strip parallel to the front surface of the same at a slight distance from the latter surface. A supporting eye 9 cooperates with this topmost hook 6 and its base part 10 is fixed on the front surface of the fastening strip 4 on the right side so that the outer part 12 of the fastening eye which limits the eye opening 11 overlaps the edge of the closure strip 5 to a certain extent in the mouth of the hook 6.

At a certain distance below the topmost closing point formed by the hook 6 and the eye 9 a so-called blind clasp 13 is provided on the front side of the left fastening strip 5 in such a way that with its end, which is preferably bent slightly downwards it overlaps to a certain extent the front of the left fastening strip 5. The hook-shaped construction of this blind clasp can serve with advantage for example in fixing the lower edge of a brassière. The actual row of fastening hooks 14 is disposed below this blind clasp on the closure strip 4 on the right side, said hooks being disposed at suitable intervals and in such a way that their base part 15 is attached by means of rivets or the like to the front side of the fastening strip whilst the flat tongue is bent back tightly over the edge of the closure strip on its rear side and projects on this to a certain extent towards the middle of the fastening strip. The fastening eyes 16 corresponding to this row of closing hooks 14 are attached by means of their broader base parts to the rear surface of the fastening strip 4 on the right side similarly to the uppermost supporting eye 9 and in such a way that the outer parts 17 of these fastening eyes which terminate on the outside slot-shaped eye holes 18, extending along the edges of the fastening strip, project in the closed position inside the hook mouth of the corresponding fastening hook to a certain extent on the edge of the fastening strip carrying the hooks.

In order to produce a fastening between the two fastening strips the uppermost eye 9 is first of all hooked over the corresponding hook 6. The eye opening 11 of this eye is of such dimensions that not only is the introduction of the hook tongue into this eye facilitated but the formation of this hook connection allows of a certain degree of angular movement between the two fastening strips as indicated in Fig. 4. In this way it is easily possible to turn the left fastening strip sideways under the blind hook 13 so that a guiding support is formed for the lower part of the two fastening strips which not only secures the correct opposite position of the fastening hooks 14 to the closure eyes 16 but also makes possible a certain support for the distortion in itself of the fastening strip 5 carrying the hooks. According to Figures 3–8 which in spite of the comparatively small width of the hook openings considerably facilitates the introduction of the hook tongues in the fastening holes 18 of the fastening eyes.

By means of the springing back of the closure strips 5 or both closure strips from their distorted position when fastening into their normal position, a connection between both fastenings is secured which it is practically impossible to undo by means of body movements. The cooperation of both fastening strips which is secured in itself by the distortion of the fastening strips permits of a comparatively small construction and a small distance between the openings of the hook tongues without complicating the formation of the fastening. The stability of the hook connection of the lower row of fastening hooks can be still further improved by making the outer parts 13 of the closure hooks 14 somewhat larger than the distance of the width of the mouth between the rear side of the closure strip 5 (covered with material) and the bent over hook tongue. At the front side the connecting parts of the lower row do not extend over the surface of the closure strips to any extent. Also the blind clasp 13 as well as the forwardly bent over supporting hook 6 form practically no projections which will in any way hinder or endanger washing of the parts lying over the same. The supporting hook connection 6, 9 is with advantage covered by a rosette 19 fixed to one of the edges of the corset.

The lower resilient edge part of the corset 10 adjoining the part reinforced by the closure strips 4 and 5 is preferably closed as usual by means of alternately disposed hook fastenings 20 of the known type. In order to open the corset, after opening these rows of hooks 20 the lower end part of the fastening strips 4 and 5 according to Figs. 3–8 is first of all distorted in itself so that the fastening hook 14 can be removed from the corresponding eyes after which the unfastening of the part of the fastening, as can be easily seen, may be effected without difficulty.

Having now particularly described and ascertained the nature of my said invention and in what manner the same is to be performed, I declare that what I claim is:—

1. A device for fastening corsets comprising a fastening strip carried by each adjacent free edge of the corset opening, a flat hook and a plurality of flat hook receiving eyes carried by one strip, a flat eye and a plurality of flat hooks carried by the other strip, said hook of said first strip having its shank attached to the inside of said strip and having its hook portion extending closely around the free edge of said strip to overlie the outside thereof in close parallel relation thereto, said eye of said second strip being enlarged to permit angular displacement of said hook in the flat plane thereof, the corresponding eyes of said first strip being relatively narrower than said eye of said second strip to prevent angular displacement of said hooks in the plane of said strips, said eyes of said first strip being secured to the underside thereof, and said hooks of said second strip having their shanks secured to the outside thereof and having their hook portions extending closely around the free edge of said strip to underlie the inner surface thereof.

2. A device for fastening corsets comprising a fastening strip carried by each adjacent free edge of the corset opening, a flat hook and a plurality of flat hook-receiving eyes carried by one strip, a flat eye and a plurality of flat hooks carried by the other strip, said solitary hook and eye being at the upper ends of their respective strips, said hook of said first strip having its shank attached to the inside of said strip and having its hook portion extending closely around the free edge of said strip to overlie the outside thereof in close parallel relation thereto, said eye of said second strip being enlarged to permit angular displacement of said hook in the flat plane thereof, said eyes of said first strip being relatively narrower than said eye of said second strip to prevent angular displacement of said hooks in the plane of said strips, said eyes of said first strip being secured to the underside thereof, and said hooks of said second strip having their shanks secured to the outside thereof and having their hook portions extending closely around the free edge of said strip to underlie the inner surface thereof.

HANS LOBBENBERG.